Patented Jan. 15, 1929.

1,699,393

UNITED STATES PATENT OFFICE.

JACOB FREDERICK CARL HAGENS AND LUDWIG ROSENSTEIN, OF SAN FRANCISCO, AND WILHELM HIRSCHKIND, OF ANTIOCH, CALIFORNIA, ASSIGNORS TO THE BARRETT COMPANY, OF NEW YORK, N. Y., A CORPORATION OF NEW JERSEY.

PRODUCTION OF DICALCIUM PHOSPHATE AND AMMONIUM SULPHATE.

No Drawing.       Application filed May 12, 1927.  Serial No. 190,960.

This invention relates to a process for the production of dicalcium phosphate and ammonium sulphate from phosphoric acid (or its calcium acid salts), calcium sulphate and ammonia.

The products which result from this process, namely dicalcium phosphate and ammonium sulphate, are each valuable fertilizing materials in themselves and the mixture of these two substances as produced by our process is especially valuable because of the intimacy of the association. They each have uses other than as fertilizing materials. Thus, for example, pure dicalcium phosphate is readily transformed by phosphoric acid into monocalcium phosphate which is a common ingredient of baking powders; ammonium sulphate, besides being used as a fertilizer ingredient, also enters into the production of ammonium nitrate and other ammonium products. They are readily separated by taking advantage of the fact that dicalcium phosphate is insoluble while ammonium sulphate is readily soluble in water.

Dicalcium phosphate is referred to in the fertilizer trade as "citrate soluble phosphate" and the term will be used hereafter in this sense.

The process to be described produces a material which may be used directly as a fertilizer or as an ingredient in mixed fertilizers; or the constituents thereof may be separated by dissolving the ammonium sulphate with water and crystallizing it.

This invention is based on the discovery that a reaction between phosphoric acid, gypsum and ammonia occurs under the proper conditions to produce the above named products. The reaction may be written as follows:

I. $H_3PO_4 + CaSO_4 + 2NH_3 =$
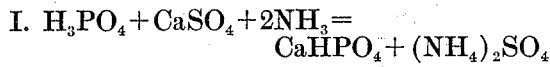

We have found that this reaction proceeds rapidly and smoothly to completion. Its rate is greatly increased by the presence of a certain amount of water and we, therefore, prefer to operate the process with commercial 80% phosphoric acid and calcium sulphate which contains its usual two molecules of water of crystallization, but we in no wise limit our invention to the exclusive use of these materials.

The dicalcium phosphate produced by this process is still capable of reacting with further quantities of calcium sulphate and ammonia to form tricalcium phosphate and a further quantity of ammonium sulphate, as shown by the following reaction:

II. $2CaHPO_4 + CaSO_4 + 2NH_3 =$
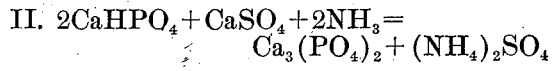

but as tricalcium phosphate is generally considered undesirable for fertilizer purposes and also is not as economical for other uses as dicalcium phosphate, our invention includes the limitation of conditions so that reaction I preponderates and reaction II will be substantially excluded. This we accomplish by either:

a. Discontinuing the introduction of ammonia when substantially two molecular weights thereof have been combined for each molecular weight of phosphoric acid; or, b. By mixing the calcium sulphate and phosphoric acid in such proportions that there is substantially one molecular weight of phosphoric acid to each molecular weight of calcium sulphate.

As before indicated when these conditions are maintained reaction II is practically excluded.

Referring back to reaction I, this may be considered as taking place in two stages. The first being neutralization of phosphoric acid by ammonia which may be written as follows:

I$^A$. $H_3PO_4 + 2NH_3 = (NH_4)_2HPO_4$ di-ammonium-hydrogen phosphate.

Secondly, a reaction between di-ammonium-hydrogen phosphate with calcium sulphate, which may be written I$^B$. $(NH_4)_2HPO_4 + CaSO_4 =$

and as a matter of fact our process may be carried out in two steps. First neutralizing phophoric acid with ammonia to produce solid di-ammonium-hydrogen phosphate and then bringing the latter solid compound into intimate contact with solid gypsum. Reaction I$^B$ will then take place, especially if a small amount of water be added to catalyze it.

Certain of the calcium acid salts of phosphoric acid, more especially monocalcium phosphate, will react similarly to phosphoric acid and may be substituted for it and are therefore the equivalent of it provided the limitations mentioned in the previous paragraph are adhered to so that the formation of tricalcium phosphate is avoided. The reaction with monocalcium phosphate is then as follows:

III. 

Ordinary commercial acid phosphate is a mixture containing monocalcium phosphate and calcium sulphate in such proportions that there are present approximately two molecular weights of calcium sulphate to each molecular weight of water soluble $P_2O_5$. Therefore, when commercial acid phosphate is to be used in this process it must first be mixed with the proper amount of phosphoric acid or material containing a high percent of water soluble $P_2O_5$; or it may be used as commercially produced provided the absorption of ammonia be stopped when substantially two molecular weights of ammonia have been combined for each molecular weight of water soluble $P_2O_5$.

A mixture especially suited for the above described process is produced by treating raw phosphate rock or bone phosphate with a mixture of phosphoric acid and sulfuric acid in such proportions that in the final product the molecular ratio of water soluble $P_2O_5$ and calcium sulphate shall be one to one. In this case the reaction that takes place is as follows:

IV. 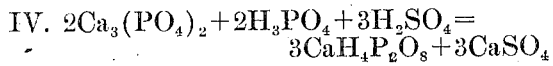

When reaction I takes place heat is liberated. Since it is undesirable to allow the mixture to get too hot provisions must be made for removing such heat by proper cooling methods. It is also highly desirable to keep the reacting mixture in a state of agitation during the reaction but as types of equipment for carrying on the reaction are not within the scope of the present invention, means of effecting cooling and agitation will not be further described.

The ammonia which enters into this reaction may be supplied either as pure gas, as diluted gas or as liquid anhydrous ammonia. We prefer to work with ammonia as a diluted and humidified gas carrying an amount of inert gas sufficient, or nearly sufficient, to carry off the heat of the reaction.

What we claim is

1. A process which consists in treating a mixture of phosphoric acid and calcium sulphate with ammonia to produce dicalcium phosphate and ammonium sulphate.

2. A process for producing dicalcium phosphate and ammonium sulphate which consists in treating a mixture of phosphoric acid and calcium sulphate with an amount of ammonia substantially such that not more than two molecular weights of ammonia are combined for each molecular weight of phosphoric acid in the original mixture.

3. A process for producing dicalcium phosphate and ammonium sulphate which consists in forming a mixture of phosphoric acid and calcium sulphate in substantially such proportions that there be not over one molecular weight of calcium sulphate to each molecular weight of phosphoric acid, and allowing such mixture to combine with ammonia.

4. A process for producing dicalcium phosphate and ammonium sulphate which consists in forming a mixture of a calcium acid salt of phosphoric acid with calcium sulphate in such proportions that there is present substantially one molecular weight of calcium sulphate for each molecular weight of water soluble $P_2O_5$ and allowing the mixture to absorb ammonia.

5. A process for producing dicalcium phosphate and ammonium sulphate which consists in forming a mixture of a calcium acid salt of phosphoric acid with calcium sulphate and allowing said mixture to combine with ammonia until substantially two molecular weights of ammonia have been combined for each molecular weight of water soluble $P_2O_5$ present in the original mixture.

6. A process for the manufacture of dicalcium phosphate and ammonium sulphate which consists in treating with ammonia a mixture of material containing water soluble phosphoric acid and calcium sulphate in substantially the proportions of one molecular weight of calcium sulphate for each molecular weight of water soluble $P_2O_5$, and separating from the product ammonium sulphate by leaching with water.

7. A process for producing dicalcium phosphate and ammonium sulphate which consists in forming a mixture of a calcium acid salt of phosphoric acid with calcium sulphate in such proportions that there is present substantially one molecular weight of calcium sulphate for each molecular weight of water soluble $P_2O_5$ and bringing such mixture in contact with liquid anhydrous ammonia.

8. A process for producing dicalcium phosphate and ammonium sulphate which consists in forming a mixture of a calcium acid salt of phosporic acid with calcium sulphate and allowing said mixture to combine with ammonia until not more than two molecular weights of ammonia have been combined for each molecular weight of water soluble $P_2O_5$ present in the original mixture.

In testimony whereof we have hereunto set our hands this sixth day of May, A. D. 1927.

JACOB FREDERICK CARL HAGENS.
LUDWIG ROSENSTEIN.
WILHELM HIRSCHKIND.